Feb. 9, 1971     D. E. REDGWELL     3,562,365

PROCESS FOR MOULDING DENTURES

Filed Sept. 4, 1968

INVENTOR

DEREK E. REDGWELL

BY Emory L. Groff Atty

United States Patent Office 3,562,365
Patented Feb. 9, 1971

3,562,365
PROCESS FOR MOULDING DENTURES
Derek E. Redgwell, 24 Manor Road,
Guildford, Surrey, England
Filed Sept. 4, 1968, Ser. No. 757,359
Claims priority, application Great Britain, Sept. 6, 1967,
40,665/67
Int. Cl. A61c *13/00;* B29c *1/02*
U.S. Cl. 264—16                                    2 Claims

ABSTRACT OF THE DISCLOSURE

A method in which a cavity is first formed in a moulding material in a flask by using a wax model of the article attached to a plug, the plug then being removed and the wax melted out, moulding dough then being inserted in quantity in excess of the cavity and forced in by a second smaller plug so that excess material passes out around the second plug, the dough then being cured with the second plug clamped in position.

BACKGROUND OF INVENTION

This invention concerns an improved moulding process for the moulding of small articles such as dentures from a synthetic plastics material, and utilising the known technique of first forming a model of the article in wax, obtaining a cast in plaster, and subsequently forming the article from the cast in a synthetic plastic dough, such as an acrylic dough, which is then cured and hardened.

An object of the invention is to provide a moulding process which ensures accuracy in the transfer from the wax to plastic stage, and one which can be carried out in less time than conventional processes, and by semi-skilled labour. Another object is to provide a process in which little finishing of the article after moulding is required.

SUMMARY OF THE INVENTION

In the process according to the invention, the wax model is secured to a plug member of a volume greater than the volume of the model, inserting the model and plug member into a moulding material in a flask or like container so that both model and plug are within the material with the model lowermost, allowing the moulding material to set and harden, removing the plug to leave a space into the material, immersing the flask or container in a bath of hot liquid to melt the wax which flows up into the space left by the plug and through sprue holes in the material formed by the wax at the junction of the model and plug, flushing out the cavity formerly occupied by by the wax, placing moulding dough in the space in excess of the volume of the cavity, forcing the dough into the cavity by a second plug of smaller cross section than the first plug so that excess dough passes up between the second plug and the space wall, and curing the dough when within the material with the second plug clamped in the space.

After curing, the moulding material is removed from the flask or the like and the material is broken away and the moulded article removed.

The usual process for producing dentures by moulding is to use a two-part (upper and lower) mould or flask, the one part being filled with moulding material such as plaster of paris, the model then inserted, the other part filled with plaster and located accurately on the one part so that the model is within the plaster in both parts. The mould is immersed in the hot liquid, such as boiling water, so that the wax melts and is removed, and the cast filled with the dough which is then cured. With the known process, the flask at the junction of the parts must be removed, and also the plaster may be distorted when the two parts are united with the dough in the cast.

With the process of this invention, the excess dough escapes between the smaller or second plug and the surface of the space in the plaster formed by the first plug, and little cleaning and trimming of the finished product is necessary.

BRIEF DESCRIPTION OF THE DRAWINGS

The accompanying drawings illustrate one form of apparatus for carrying out the process of the invention. In the drawings.

DESCRIPTION OF PREFERRED EMBODIMENT

Figure 1A:
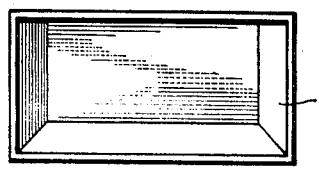
FIGS. 1A, 1B and 1C are respectively plan, end and side elevations of a flask.
Figure 1B:
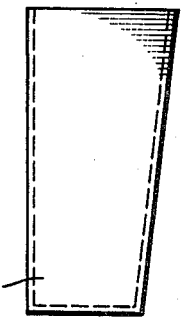
Figure 1C:
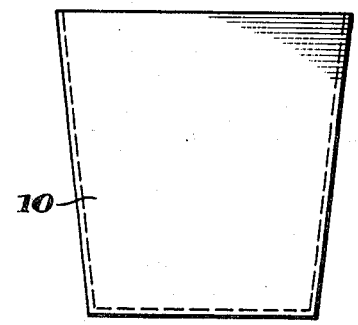

Referring firstly to FIGS. 1A–1C, the flask 10 is of a non-corrosive material such as aluminium or brass and it could be made in hinged sections for easy removal of the cast. It will be seen that the flask tapers slightly downwardly, and it is of a size large enough to accept the article to be moulded and the large plug (see FIG. 4).

Figure 2:
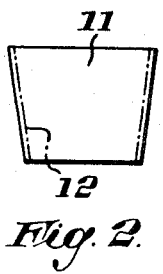
FIG. 2 is an elevation of the larger plug.

Two plugs are used in carrying out the process, the larger plug referenced 11 being shown. This is of a frustoconical shape, being circular in plan. The second plug is slightly smaller in area top and bottom and of identical shape to the larger plug, of a size for example as shown in broken lines 12, FIG. 2.

Figure 3:
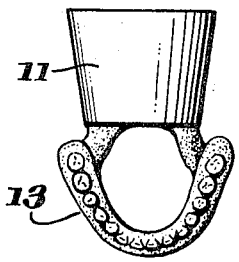
FIG. 3 shows diagrammatically a denture fixed to the plug of FIG. 2.

FIG. 3 shows a wax moulding or denture 13 which will have ancilliary attachments in the usual way, secured at its highest point to the plug 11 by one or more sprues or channels.

Figure 4:
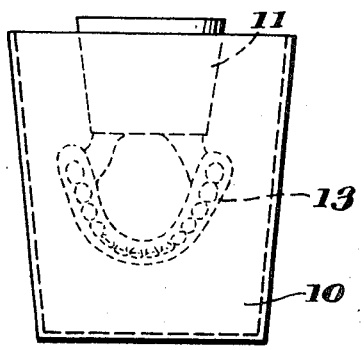
FIG. 4 is a side elevation of the flask showing the denture and plug in the moulding material.
Figure 5:
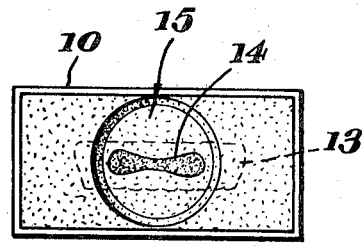
FIG. 5 is a plan view of FIG. 4.

In carrying out the process, plaster of paris or other moulding material is placed in the flask, and the plug 11 with the denture or moulding is placed therein, the quantity of material used being such that the flask is substantially filled. FIG. 4 shows the plug and moulding in broken lines in the flask.

The moulding material is then allowed to set and harden, and the plug is withdrawn, leaving the wax moulding within the moulding material. It is necessary to arrange for the easy withdrawal of the plug, the taper shape ensuring this, and its surfaces contacting with the moulding material could also be wiped over prior to insertion into the material with a substance inhibiting adhesion between the plug and material.

The flask is now immersed in a hot liquid bath such as boiling water, so that the wax melts and floats out of the sprue hole or holes 14. When all possible wax has been eliminated the mould cavity is flushed out with a solvent or cleansing fluid and then with a conventional cold coating solution in the usual way.

The acrylic dough is now placed in the space 15 formed by the large plug, and the second smaller plug is pressed on to the dough to force same into the mould cavity. The amount of dough placed in the space is more than necessary to fill the cavity and excess dough passes up between the plug and wall of the said space. The volume of the space must be greater than the volume of the cavity to be filled with dough.

The plug is held in place by a clamp such as a simple U-clamp with thumb screw (not shown) and the dough is then cured. The plaster is then removed from the flask and from the moulded article which is then finished off in the usual way.

Known methods of manufacturing dentures and the like by moulding, utilising a two-part mould, call for considerable skill as each article must be dealt with according to its form. Generally a two-part mould must be made for each unit, and after moulding the parts have to be separated and flushed out with boiling water until clean.

With the method according to this invention an accurate moulding is obtained, with no flask to thicken the article. Less strain is put on the moulding material. Great accuracy is obtained in the wax to plastic transfer stage, although the method can be carried out in less time than with known processes and with semi-skilled labour.

I claim:

1. Process for the moulding of small articles such as dentures from a synthetic plastics material dough, in which process the wax model is secured to a plug member of a volume greater than the volume of the model, inserting the model and plug member into a moulding material in a flask or like container so that both model and plug are within the material with the model lowermost such that the plug contacts the model, allowing the moulding material to set and harden, removing the plug to leave a space into the material, immersing the flask or container in a bath of hot liquid to melt the wax which flows up into the space left by the plug and through sprue holes in the material formed by the wax at the junction of the model and plug, flushing out the cavity formerly occupied by the wax, placing moulding dough in the space in excess of the volume of the cavity, forcing the dough into the cavity by a second plug of smaller cross-section than the first plug so that excess dough passes up between the second plug and the space wall, and curing the dough when within the material with the second plug clamped in the space.

2. Process as claimed in claim 1, in which the plugs are of tapering shape, the first plug having the model secured to its end surface of smaller diameter.

References Cited

UNITED STATES PATENTS

| | | | |
|---|---|---|---|
| 1,335,372 | 3/1920 | Fredericks | 264—317 |
| 2,192,902 | 3/1940 | Erdle | 264—18 |

ROBERT F. WHITE, Primary Examiner

R. H. SHEAR, Assistant Examiner

U.S. Cl. X.R.

264—221